J. KIEWICZ.
STOP MOTION.
APPLICATION FILED FEB. 29, 1916.

1,234,772.

Patented July 31, 1917

Inventor.
John Kiewicz
by Heard Smith & Tennant.
Attys.

UNITED STATES PATENT OFFICE.

JOHN KIEWICZ, OF BOSTON, MASSACHUSETTS, ASSIGNOR TO THE REECE BUTTON HOLE MACHINE COMPANY, OF BOSTON, MASSACHUSETTS, A CORPORATION OF MAINE.

STOP-MOTION.

1,234,772.  Specification of Letters Patent.  Patented July 31, 1917.

Application filed February 29, 1916. Serial No. 81,252.

*To all whom it may concern:*

Be it known that I, JOHN KIEWICZ, a citizen of the United States, residing at Boston, county of Suffolk, State of Massachusetts, have invented an improvement in Stop-Motions, of which the following description, in connection with the accompanying drawing, is a specification, like characters on the drawing representing like parts.

This invention relates to stop motions such as are used in connection with machines of various types for bringing the parts to rest when the driving clutch or other driving element is disengaged, and the objects of the invention are to provide a novel stop motion which is comparatively noiseless in its operation and which brings the driven element to rest with a cushioned movement and without any sudden jar or blow, and which also is accurate and positive in its operation, and which has other advantages, all as will be more fully hereinafter set forth.

In order to give an understanding of my invention, I have illustrated in the drawings a selected embodiment thereof which will now be described, after which the novel features will be pointed out in the appended claims.

Figure 1:
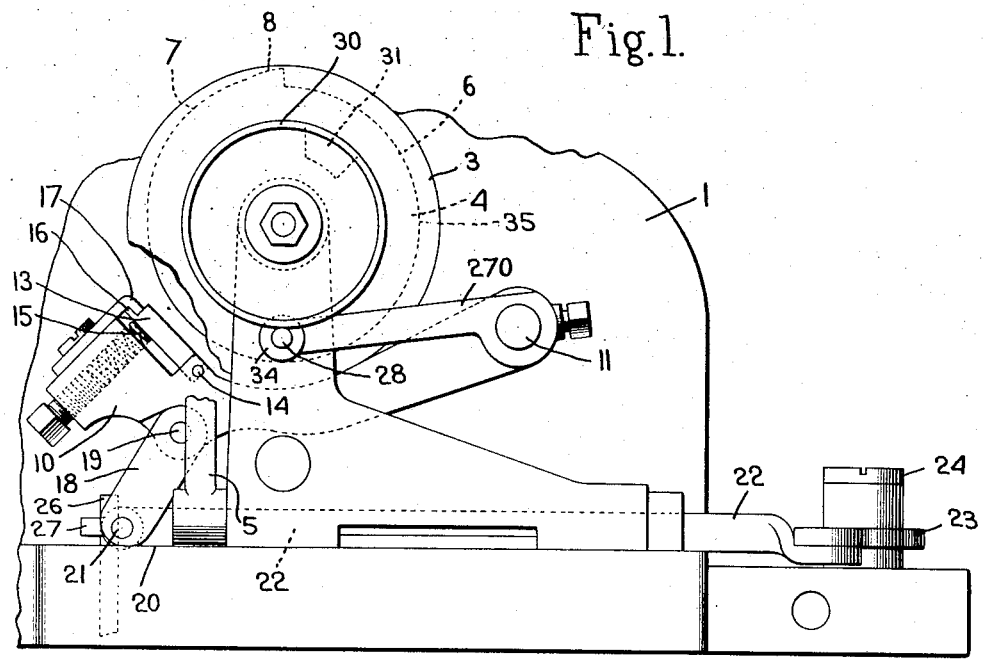
Figure 1 is a side view of a stop motion embodying my invention.

My improved stop motion is adapted for use on a great variety of different machines, such, for instance, as sewing machines, different kinds of machines for making shoes, etc., where it is desirable to bring the parts to rest quickly and in a predetermined position when the driving clutch is disengaged, and as my invention is capable of use with such a wide variety of machines, I have not illustrated herein any complete machine, but have merely shown at 1 a portion of a machine equipped with my improved stop motion. 2 indicates the driving shaft of the machine which may be driven from a driving element of any suitable or appropriate construction. As illustrative of one well-known form of driving element, I have shown a driving pulley 3 which is loosely mounted on the shaft 2 but is adapted to be clutched thereto or unclutched therefrom by any well-known clutch mechanism. The driving pulley 3 may form one of the clutch elements, and in the illustrated embodiment of the invention, the other clutch element is shown at 4. The clutch pulley 3 is moved into and out of clutching engagement with the clutch member 4 by means of a clutch actuator 5 that may be operated in any suitable way. The parts as thus far described are or may be of any suitable construction and form no part of my present invention.

For convenience I will hereinafter refer to the shaft 2 as the driven member because it is the member which is driven from the driving element 3.

My improved stop motion is constructed to co-act with the driven member 2 to bring it to rest with a cushioned movement and without any of the jar or shock which is a necessary incident to some stop motions.

My improved stop motion comprises a rotary brake member which is rigid with the driven member and which is provided with an eccentric or cam-shaped braking surface, and which will, therefore, be hereinafter referred to as the brake cam, a coöperating brake member adapted to be moved into and out of engagement with said brake cam and a strut member by which the brake member is given its movement, said strut member operating not only to force the brake member into engagement with the brake cam, but also to lock it in such position. The brake cam is herein shown as constituted by the driven clutch member 4, the latter having its peripheral face shaped to present an eccentric braking surface. This member 4 is shown as having a peripheral face presenting the concentric portion 6 which merges into the eccentric or cam portion 7, the latter having at its end a more or less abrupt rise 8. The brake member which coöperates with this brake cam is in the form of an arm 10 rigidly mounted on a rock-shaft 11 that is journaled in suitable bearings 12 carried by the machine 1. This brake member is provided with a friction block 13 that is adapted to engage the periphery of the brake cam 4 when the brake member is thrown into its operative position. The friction block 13 will preferably be yieldingly sustained by the brake member 10, this being herein accomplished by pivoting said block to the brake member, as at 14, and providing a spring 15 against which the block 13 rests, and which forms a yielding backing therefor. The block 13 is provided with a lip 16 which is adapted to engage a keeper 17 in the form of a hooked member secured to the end of the brake member 10, said keeper limiting the outward movement of the block. It will be noted that the rock-shaft 11 is at one side of the shaft 2 so that swinging movement of the arm or brake member 10 about the shaft 11 will move the friction block 13 into or out of engagement with the periphery of the brake cam 4. For thus moving the brake member into operative engagement with the brake cam, I have provided a strut member 18 which is pivoted to the brake member 10 at 19 and one end of which has sliding engagement with an abutment surface 20 formed on the machine 1. The strut member 18 is of such length and shape that it normally stands at an angle to the abutment surface 20, as shown in Fig. 1. With this construction it will be seen that if the lower end of the strut member 18 is moved to the right, Fig. 1, the brake member 10 will be forced upwardly, thereby bringing the friction block 13 into engagement with the periphery of the brake cam, and the construction is such that when the brake member is in operative engagement with the brake cam, the strut member will stand at substantially right angles to the abutment face 20 and will thus positively lock the brake member in its operative position.

Various devices may be employed for giving the strut member this movement by which the brake member is forced into its operative position. In the construction shown, the lower end of the strut member has a link 22 pivoted thereto at 21, which link is connected at its rear end to a lever 23 pivoted to the machine 1 at 24 and acted upon by a spring 25. The link 22 is normally held in its forward position shown in the drawing thereby holding the strut in its inoperative position, this being accomplished by means of a latch 26 which is adapted to engage a shoulder 27 formed on the link 22. When the latch 26 is released, the spring 25 will move the link 22 to the right, Figs. 1 and 2, thereby moving the lower end of the strut member on the abutment surface 20 and causing the brake member to be thrown into engagement with the brake cam. So long as the brake member engages the concentric portion 6 of the brake cam, it will have merely a braking effect upon the driven element, but when the eccentric portions 7, 8 of the brake cam come into engagement with the brake member, then a wedging action will take place which brings the driven element to rest with an easy gradual movement and without any shock. The yielding friction block 13 also adds to the cushioned effect of the stopping movement. The construction of the parts is such that the abrupt or high portion 8 of the surface of the brake cam cannot pass the friction block 13 so that the driven element will always be brought to rest at a predetermined point in its revolution.

Figure 3:
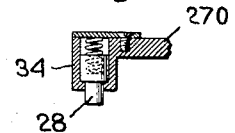
Fig. 3 is a sectional view through the end of the arm 270.

I have also provided herein means which permit the movement of the brake member from its inoperative to its operative position only when the driven element is in a predetermined angular position. For this purpose I have provided an arm 270 fast to the rock-shaft 11 and which carries at its end a pin or projection 28 that is adapted to bear on a track 29 formed on the head 30. This head 30 is rigid with the driven shaft 2. This head 30 is cut away at one point, as at 31, and is also provided with the inclined face 32 which extends from the bottom of the cut-away portion to the side face 33 of the head 30. When the parts are held in their inoperative position by the latch 26, the brake member 10 is held out of engagement with the brake cam and the projection 28 on the arm 270 is also held out of engagement with the track 29. When the latch 26 is released the spring 25 will tend to move the link 22 to the right, Fig. 1, and this movement will operate through the strut 18 to lift the brake member 10 upwardly. Such upward movement, however, is prevented by the engagement of the pin 28 with the track 29. When during the continued rotation of the driven element 2 the notch or cut-away portion 31 is brought into alinement with the pin 28, then the spring 25 acts to move the strut 18 to the right, Fig. 1, and force the brake member 10 upwardly into engagement with the brake cam and also carry the pin 28 into the cut-away portion 31. The pin 28 is yieldingly mounted in the end 34 of the arm 270, as shown in Fig. 3, and as the head 30 continues to rotate, the inclined wall 32 engages the end of the pin 28 and forces the latter backwardly, said pin then moving over the face 33 of the head. The notch 31 is so positioned relative to the eccentric portions 7 and 8 of the brake cam 4 that said notch comes into alinement with the pin 28 just after these eccentric portions of the brake cam have passed the friction block 13. As a result, when the stop motion is operated, the friction block 13 of the brake member is brought into engagement with the concentric portion 6 at about the point 35, and the driven element will, therefore, be subjected to a braking effect for a predetermined portion of a revolution before the eccentric portions of the cam member cooperate with the brake member to bring the parts to rest. Therefore, the brake member will always be brought into operative engagement with the brake cam at a predetermined point in the revolution thereof, regardless of the position of the parts when the latch 26 is released.

This latch 26 may be released by hand or automatically by the machine after a certain cycle of operations, depending on the character of the machine with which the stop motion is used, and as the particular way of releasing the latch forms no part of my present invention I have not deemed it necessary to illustrate herein any particular mechanism for this purpose.

Figure 2:
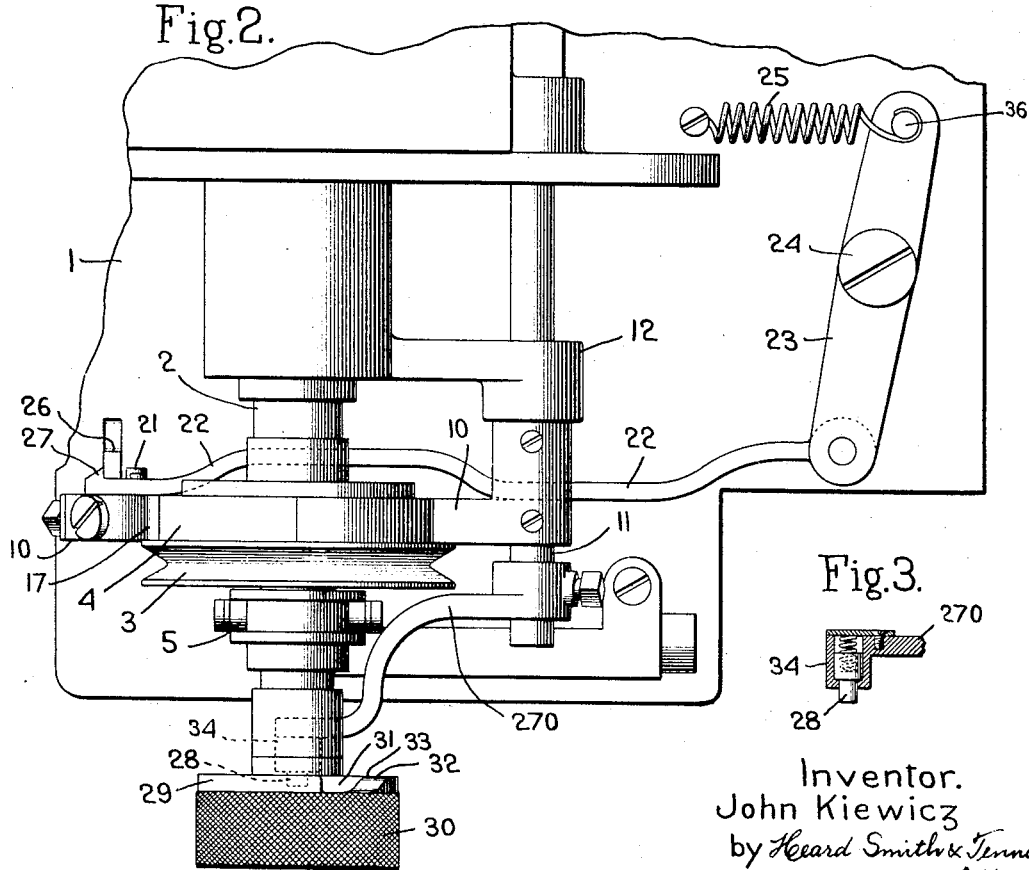
Fig. 2 is a top plan view.

When the machine is to be set in operation again, the strut member 18 may be restored to its inoperative position shown in Figs. 1 and 2 by any suitable means, and as illustrative of one device which might be used for this purpose, I have shown a handle 36 connected to the lever 23. It will be understood, of course, that the driving pulley 3 must be unclutched from the driven element before or at the time that the latch 26 is released, and the latch and clutch mechanism may if desired be connected so as to operate in unison.

While I have illustrated herein a selected embodiment of my invention, I do not wish to be limited to the constructional features shown.

I claim:

1. In a stop-motion, the combination with a driven member, of a brake cam rigid therewith and having an eccentric braking surface, a brake member mounted to swing into and out of engagement with said brake cam, a strut member pivotally connected to the brake member, an abutment surface with which the end of the strut member has sliding wedging engagement, and means to move the strut member on the abutment surface in a direction to force the brake member into engagement with the brake cam.

2. In a stop motion, the combination with a driven member, of a brake cam rigid therewith, a brake member mounted to swing into and out of engagement with said brake cam, a strut member pivotally connected to the brake member, an abutment surface extending at an angle to the normal position of the strut member and with which the end of the strut member has sliding engagement, and means to move the strut member on said abutment surface in a direction to force the brake member into engagement with the brake cam.

3. In a stop motion, the combination with a driven member, of a brake cam rigid therewith, a brake member mounted to swing into and out of engagement with said brake cam, a strut member pivotally connected to the brake member, an abutment surface extending at an angle to the normal position of the strut member and with which the end of the strut member has sliding engagement, and means to move the strut member on the abutment surface into a position at substantially right angles thereto thereby to force the brake member into engagement with the brake cam and to lock the brake member in such position.

4. In a stop motion, the combination with a driven member, of a brake cam rigid therewith, a brake member mounted to swing into and out of engagement with the brake cam, a strut member pivotally connected to the brake member, an abutment surface against which the end of the strut member has sliding engagement, means to move said end of the strut member along the abutment surface in a direction to cause said strut member to force the brake member into engagement with the brake cam, and means to permit such movement of the strut member only when the driven member is in a predetermined angular position.

5. In a stop motion, the combination with a driven member, of a brake cam rigid therewith, a brake member mounted to swing into and out of engagement with the brake cam, an abutment surface extending substantially parallel to the brake member, a strut member pivotally connected to the brake member and having one end in sliding engagement with the abutment surface, and means to move said strut member on the abutment surface whereby the strut member has a wedging action to force the brake member into engagement with the brake cam.

6. In a stop motion, the combination with a driven member, of a brake cam rigid therewith, a brake member mounted to swing into and out of engagement with the brake cam, an abutment surface extending substantially parallel to the brake member, a strut member pivotally connected to the brake member and having one end in sliding engagement with the abutment surface, means to move said strut member on the abutment surface whereby the strut member has a wedging action to force the brake member into engagement with the brake cam, and means to prevent such movement of the strut member except when the driven member is in a predetermined angular position.

7. In a stop motion, the combination with a driven member, of a brake cam rigid therewith and having an eccentric braking surface, a brake member mounted to swing into and out of engagement with said brake cam, a strut member pivotally connected to the brake member, an abutment surface with which the end of the strut member has sliding wedging engagement, means to move the strut member on the abutment surface in a direction to force the brake member into engagement with the brake cam, an arm rigid with the brake member, and means rigid with the driven member and coöperating with said arm to hold the brake member out of engagement with the brake cam except when the driven member is in a predetermined position.

In testimony whereof, I have signed my name to this specification.

JOHN KIEWICZ.